United States Patent
Hulett et al.

(10) Patent No.: US 10,709,289 B2
(45) Date of Patent: *Jul. 14, 2020

(54) COOKING MANAGEMENT

(71) Applicant: Starbucks Corporation, Seattle, WA (US)

(72) Inventors: Randy Hulett, Seattle, WA (US); Izaak Koller, Seattle, WA (US); Brian Shay, Seattle, WA (US)

(73) Assignee: Starbucks Corporation, Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/290,636

(22) Filed: Mar. 1, 2019

(65) Prior Publication Data
US 2019/0254469 A1 Aug. 22, 2019

Related U.S. Application Data

(63) Continuation of application No. 14/956,152, filed on Dec. 1, 2015, now Pat. No. 10,219,651, which is a
(Continued)

(51) Int. Cl.
G05B 15/02 (2006.01)
A47J 36/00 (2006.01)
(Continued)

(52) U.S. Cl.
CPC .............. A47J 36/00 (2013.01); G05B 15/02 (2013.01); G06Q 30/00 (2013.01); G06Q 50/12 (2013.01)

(58) Field of Classification Search
None
See application file for complete search history.

(56) References Cited

U.S. PATENT DOCUMENTS 4,919,950 A 4/1990 Mak
6,202,101 B1* 3/2001 Chin ................... G06F 13/1621
710/5
(Continued)

FOREIGN PATENT DOCUMENTS

CA 2585128 A1 5/2006
CN 1229955 A 9/1999
(Continued)

OTHER PUBLICATIONS

Office Action for U.S. Appl. No. 13/684,062 dated Dec. 20, 2013, in 9 pages.
(Continued)

Primary Examiner — Fateh M Obaid
(74) Attorney, Agent, or Firm — Knobbe, Martens, Olson & Bear, LLP

(57) ABSTRACT

A cooking management system is described that identifies a customer and orders a product for the customer based at least on current temporal data. The cooking management system identifies customers associated with previous product requests that occurred during a predetermined range of time based at least on a comparison of current temporal data with temporal data associated with the previous product requests. The cooking management system causes presentation of identifiers of the identified customers on a display. Responsive to determining that the identifier for a particular customer has been selected, the cooking management system automatically causes a cooking device to prepare a product for the particular customer based at least on customer data associated with the particular customer.

20 Claims, 7 Drawing Sheets

Related U.S. Application Data continuation of application No. 13/684,062, filed on Nov. 21, 2012, now Pat. No. 9,218,633.

(60) Provisional application No. 61/563,317, filed on Nov. 23, 2011.

(51) Int. Cl.
*G06Q 30/00* (2012.01)
*G06Q 50/12* (2012.01)

(56) References Cited

U.S. PATENT DOCUMENTS

| | | | |
|---|---|---|---|
| 6,356,972 | B1 | 3/2002 | Chin et al. |
| 9,218,633 | B2 | 12/2015 | Hulett et al. |
| 9,820,603 | B2 | 11/2017 | Singer et al. |
| 10,219,651 | B2 | 3/2019 | Hulett et al. |
| 2003/0037681 | A1 | 2/2003 | Zhu et al. |
| 2004/0236696 | A1* | 11/2004 | Aoki ............... G06Q 20/04 705/50 |
| 2005/0121978 | A1 | 6/2005 | McAvoy |
| 2007/0150300 | A1 | 6/2007 | Fukazawa et al. |
| 2007/0185776 | A1 | 8/2007 | Nguyen et al. |
| 2008/0029595 | A1* | 2/2008 | Waller ............ G06Q 10/087 235/383 |
| 2009/0204504 | A1 | 8/2009 | De Araujo |
| 2010/0052421 | A1 | 3/2010 | Schindler et al. |
| 2010/0280960 | A1* | 11/2010 | Ziotopoulos ...... G06Q 20/202 705/80 |
| 2011/0167440 | A1* | 7/2011 | Greenfield ........ H04L 63/102 725/25 |
| 2011/0258072 | A1* | 10/2011 | Kerker .......... G06Q 10/0875 705/26.7 |
| 2012/0095805 | A1 | 4/2012 | Ghosh |
| 2012/0310757 | A1* | 12/2012 | Kim ............... G06Q 20/20 705/17 |
| 2013/0131883 | A1 | 5/2013 | Yamada |
| 2013/0132214 | A1* | 5/2013 | Hulett ............. G06Q 50/12 705/15 |
| 2013/0275181 | A1* | 10/2013 | DiGioacchino .... G06Q 30/0201 705/7.29 |
| 2013/0297089 | A1 | 11/2013 | Fu et al. |

FOREIGN PATENT DOCUMENTS

| | | |
|---|---|---|
| JP | H09-198448 | 7/1997 |
| JP | 2002-245154 | 8/2002 |
| JP | 2003-07657 | 3/2003 |
| JP | 2006-215647 | 8/2006 |
| JP | 2007-287082 | 11/2007 |
| JP | 2008-293322 | 12/2008 |
| JP | 2009-151408 | 7/2009 |
| JP | 2010-055248 | 3/2010 |
| JP | 2011-210008 | 10/2011 |
| KR | 10-2004-0007189 | 1/2004 |
| KR | 10-2011-0016691 | 5/2011 |
| TW | 200926034 | 6/2009 |
| TW | I343025 | 6/2011 |
| WO | WO 01/63522 | 8/2001 |
| WO | WO 2011/006198 | 1/2011 |
| WO | WO 2013/078428 | 5/2013 |
| WO | WO 2015/077237 | 9/2015 |

OTHER PUBLICATIONS

Office Action for U.S. Appl. No. 13/684,062 dated Aug. 19, 2014, in 8 pages.
Final Office Action for U.S. Appl. No. 13/684,062 dated Jan. 13, 2015, in 8 pages.
Office Action for U.S. Appl. No. 13/684,062 dated May 19, 2015, in 9 pages.
Office Action for U.S. Appl. No. 14/956,152 dated Nov. 17, 2017, in 20 pages.
Office Action for U.S. Appl. No. 14/956,152 dated Jun. 14, 2018, in 8 pages.
International Search Report and Written Opinion for Application No. PCT/US2012/66417 dated May 31, 2013, in 14 pages.
Office Action in Canadian Appl. No. 2856417 dated Jun. 19, 2018, in 5 pages.
Office Action for MX Appl. No. MX/a/2014/006075 dated May 27, 2015, in 4 pages.
Office Action for MX Appl. No. MX/a/2014/006075 dated Dec. 7, 2015, in 6 pages.
Office Action in Taiwan Application No. 104106147 dated Sep. 14, 2015, in 2 pages.
Search Report in Taiwan Application No. 104106147 dated Sep. 18, 2015, in 1 page.
Search Report in Taiwan Application No. 104106147 dated Nov. 29, 2015.
Office Action for Chinese Application No. 201280063764.4 dated Jun. 23, 2016, in 15 pages.
Second Office Action for Chinese Application No. 201280063764.4 dated Mar. 9, 2017, in 79 pages.
Third Office Action for Chinese Application No. 201280063764.4 dated Jul. 25, 2017, in 79 pages.
Fourth Office Action for Chinese Application No. 201280063764.4 dated Mar. 30, 2018, in 8 pages.
Office Action in Japanese Application No. 2014-543588 dated Aug. 15, 2016, in 8 pages.
Office Action in Japanese Application No. 2014-543588 dated Mar. 13, 2017.
Office Action in European Application No. 12808948.9 dated Dec. 20, 2016, in 8 pages.
Office Action in European Application No. 12808948.9 dated May 3, 2018, in 9 pages.
Office Action in Australian Application No. 2012340517 dated Apr. 13, 2017, in 5 pages.
Office Action in Australian Application No. 2012340517 dated Jan. 4, 2018, in 6 pages.
Office Action in Indian Application No. 4362/CHENP/2014 dated Dec. 30, 2019, in 11 pages.
Office Action in Korean Application No. 10-2014-7016599 dated Nov. 29, 2018, in 6 pages.
Office Action in Korean Application No. 10-2014-7016599 dated May 27, 2019 in 5 pages.
International Search Report and Written Opinion for Application No. PCT/US2014/066174 dated Jul. 30, 2015, in 17 pages.
International Preliminary Report on Patentability for Application No. PCT/US2014/066174 dated Jun. 2, 2016, in 11 pages.

* cited by examiner

COOKING MANAGEMENT

CROSS-REFERENCE TO RELATED APPLICATIONS

This application is a continuation of U.S. patent application Ser. No. 14/956,152, filed Dec. 1, 2015, which is a continuation of U.S. patent application Ser. No. 13/684,062, filed Nov. 21, 2012, now U.S. Pat. No. 9,218,633 issued Dec. 22, 2015 entitled COOKING MANAGEMENT, which claims priority to U.S. Patent Application No. 61/563,317, filed Nov. 23, 2011, entitled COOKING MANAGEMENT, each of which is incorporated herein by reference in its entirety.

BACKGROUND

Repeat customers of restaurants, such as fast food restaurants, coffee shops, and the like, frequently visit the commercial establishment at approximately the same time of day and often order the same product during each visit. For example, a coffee patron will often order the same type and size of coffee at approximately the same time of day each day during workdays. Due to the frequency of the visits of the customers, the employees or owners of the commercial establishment may come to know the customers by name. However, even if the employees do not learn the name of the frequent customer, the customer's name is often used to place an order and receive the order once completed. For example, at fast food restaurants and coffee shops it is not uncommon for the customer to give their name to an employee when making the order. When the order is completed, the employee calls the customer by name.

In addition, at certain times of day, certain food vendors, such as fast food restaurants and coffee shops, will experience a larger influx of customers. For example, coffee shops may often experience a large surge in customers in the morning and may experience relatively slow periods during the afternoon hours. Food vendors can experience a larger surge in customers around meal times. The surge in customers can result in longer waiting times for each customer. In addition, it can be difficult to find time to clean cooking machines, such as coffee machines, when there are a large number of customers placing orders.

DETAILED DESCRIPTION

Figure 1:
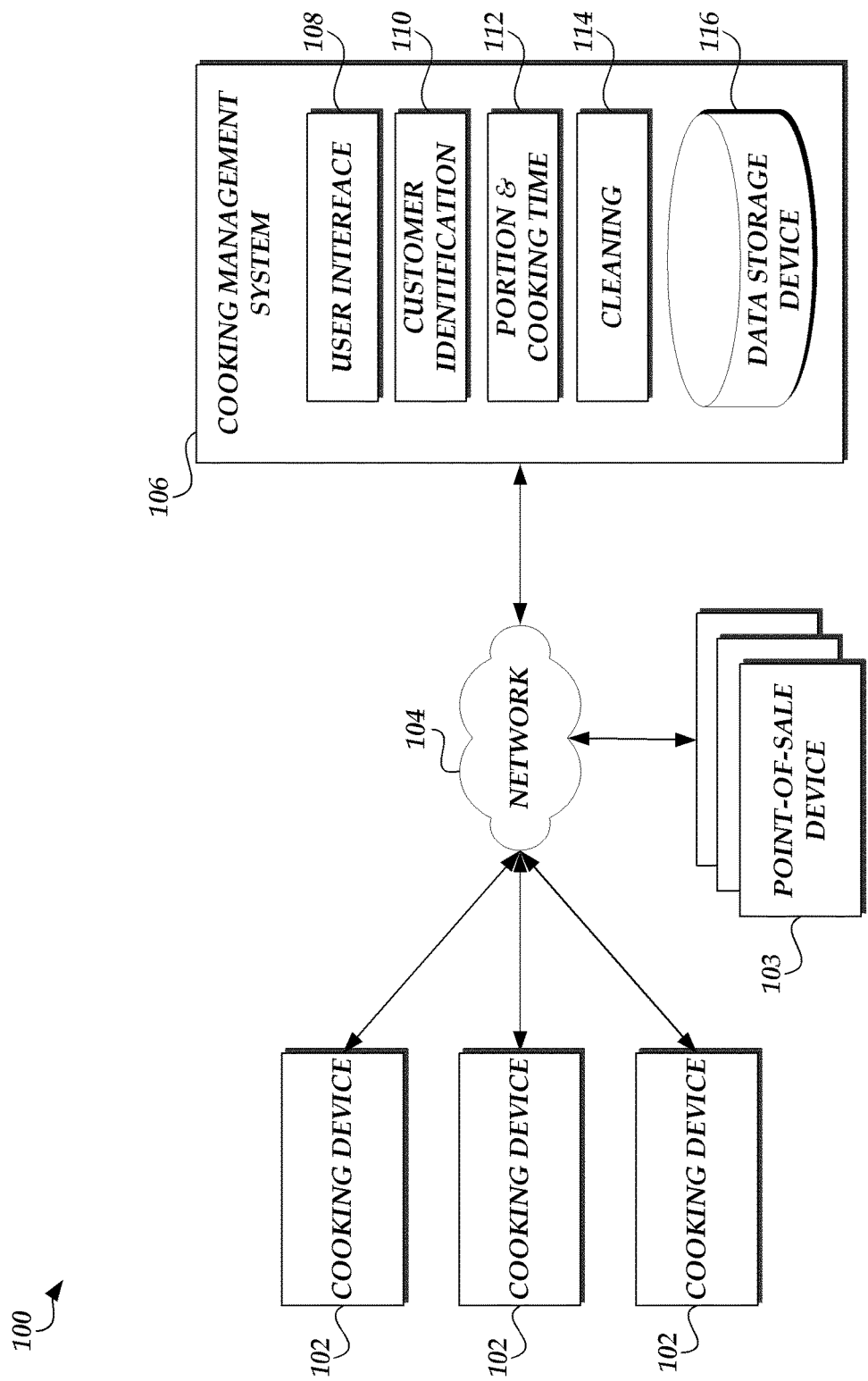
FIG. 1 is a block diagram illustrative of a cooking management environment including one or more cooking devices and a cooking management system.

Generally described, the present disclosure is directed to a system, method, and computer readable non-transitory storage medium for a cooking management system for managing a cooking device based on at least one or more of temporal data, usage data, and a product request. Specifically, aspects of the disclosure will be described with regard to receiving a current product request, obtaining current temporal data, comparing the current temporal data and current product request with temporal data and previous product requests associated with customer data, identifying a customer based on the comparisons, and displaying a customer's name on a display device and/or updating a customer profile based on the current product request and the current temporal data. As used herein, a customer's name is to be interpreted broadly and can include, but is not limited to, a given name, nickname, pseudonym, symbol, number, or other identifier. In some embodiments, the customer's name is an identifier provided by the customer.

Additional aspects of the disclosure will be described with regard to obtaining current temporal data, displaying customer data associated with the temporal data of previous product requests, requesting a product based on the customer data and current temporal data, and/or displaying a customer's name on a display device. Furthermore, aspects of the disclosure will be described with regard to identifying a customer based on location information of the customer, the previous product requests, the cooking device, and/or the product vendor. In addition, aspects of the disclosure will be described with regard to using current temporal data and previous product requests to determine an appropriate type, size, amount of constituent elements as well as cooking time of a product. In addition, aspects of the disclosure will be described with regard to using current use data and current temporal data to determine an appropriate cleaning time and/or cleaning frequency of a cooking device.

In the present disclosure, temporal data refers to data relating to time. For example, temporal data may include, but is not limited to, time of day data, date data, holiday data, weekday and weekend data, seasonal data, as well as time of year data. Thus, temporal data is to be interpreted broadly and should encompass any data relating to time.

In the present disclosure, a product request refers to a request for a product received and/or stored by the cooking management system (CMS). The product request can include data regarding the type of product ordered, the size of product ordered, temporal data regarding the time at which the product request occurred, etc.

In the present disclosure, customer data refers to data related to one or more customers. Customer data may include, but is not limited to, a given name, nickname, pseudonym, product requests associated with the customer, temporal data associated with the product requests associated with the customer, location data of the product requests associated with the customer, tendencies or predictions of the customers' product requests, customer rating, and the like. Thus, customer data is to be interpreted broadly and may encompass additional customer information, such as a phone number, physical and/or e-mail address, credit/debit card information, a picture, membership information, customer profile, loyalty program information, etc.

In the present disclosure, cook or cooking refers to preparing a food or beverage with or without the use of heat. For example, cooking may include, but is not limited, brewing, boiling, baking, roasting, frying, microwaving, mixing, stirring, beating, percolating, straining, intermixing, dissolving, etc.

As an example, and not to be construed as limiting, a repeat customer, Customer1, is a frequent customer of a coffee shop. Customer1 consistently orders a similar type of coffee during each visit, such as a large drip Sumatra coffee. Each time Customer1 orders, the name of the customer, store location, order information, and temporal data associated with the order information are stored as a product request and associated with Customer1. The order information can include the type and size of coffee ordered and any preferences of Customer1, and the temporal data can include the time of day, week, holiday, year, etc., and any other data regarding the time at which Customer1 places his or her order.

During a subsequent visit to the coffee shop, when Customer1 places another order for his standard large drip Sumatra coffee and the CMS receives Customer1's product request, the CMS can obtain the current temporal data (e.g., current time and date) and compare the current temporal data with the temporal data of tens, hundreds, thousands, or more previous product requests. The CMS can also compare the current product request with previous product requests for the same product, as well as the location of the current product request, previous product requests, cooking device, customer, etc. For example, the CMS can compare the current coffee order for a large drip Sumatra with previous coffee orders for a large drip Sumatra made at approximately the same time of day, day of the week, etc. (e.g., similar temporal data). As mentioned, the previous coffee orders can be stored in the data storage device as product requests and associated with the customer data of the individual customers, including Customer1.

Upon comparing the current product request with the previous product requests, and comparing the temporal data of the current product request with the temporal data for the previous product requests, the CMS can determine that the customer ordering the large drip Sumatra coffee is Customer1. The CMS can provide the name of Customer1 to a display device for verification, and the user and/or customer can verify that the customer placing the order is Customer1 by selecting the name of Customer1 from the display device and/or by writing or otherwise inputting the name of the customer on an electronic device, such as a touch sensitive or capacitive input screen of a mobile device, point-of-sale device, or the like. Upon receiving verification that the customer placing the order is Customer1, the CMS can update the customer data associated with Customer1 and/or cause the name of Customer1 to be displayed on a display device. The displayed name can either be a printed name, an image of the name as it was written on the electronic device, a stored image, etc.

The display device can be located on or be part of the coffee machine, point-of-sale device, or other display device and display that an order has been placed and that the large drip Sumatra is being made. In certain embodiments, in response to the comparison of the current product request with previous product requests and the comparison of the temporal data of the current product request with the temporal data for the previous product requests, the CMS can identify multiple customer names that could correspond to the current customer and cause these identified customer names to be displayed. In such instances, the display device can display the names of the various customers associated with the current product request and the temporal data of the current product request. In response, an employee, or other user, can verify the identity of the customer making the current product request. Such verification can occur by the store employee asking or knowing the customer name and then selecting the appropriate surfaced name on the display, or writing the customer's name on an electronic device. In this example, the identified customer is Customer1, and once verified, the CMS can cause the display device to display the name of Customer1. The CMS can update the customer data associated with Customer1. As part of the update, the CMS can increase a customer rating of Customer1 so that during a subsequent visit the name of Customer1 will more likely appear on the list of potential customers. In some embodiments, a higher customer rating results in the name of the customer being displayed more prominently on the display device, such as in larger font, closer to the top, highlighted, flashing, etc.

As another example, and not to be construed as limiting, the CMS can monitor the temporal data and provide on a display a list of identifiers (e.g., names, symbols, image, etc.) of customers that frequently place coffee orders at that location during that time of day, day of week, etc. For example, the display can display one or more identifiers of Customer1, Customer2, Customer3, etc. between 9 am and 10 am, Monday through Friday. When Customer1 enters on Monday at 9:30 am and requests his standard cup of coffee, the large drip Sumatra, a user can select the identifier of Customer1 on the display. Once the user has selected the identifier of Customer1 on the display, the CMS can place the order with the coffee machine, and the coffee machine can display the name of Customer1. In some embodiments, the CMS can display an identifier of the product associated with the customer along with the customer's name, or multiple identifiers if more than one product is associated with the customer. If multiple identifiers are displayed, the user can select the applicable product based on the customer's current preference. For example, if Customer2 typically selects a hot chocolate, espresso, or cappuccino, the CMS can display an identifier of each drink in association with Customer2. Accordingly, if Customer2 orders a hot chocolate, the user can select the hot chocolate identifier. In certain embodiments, the display includes promotions relevant to the one or more products associated with Customer1. For example, with continued reference to Customer2, the CMS can display a promotion indicating that a complementary croissant is included with the purchase of a large hot chocolate. Furthermore, once the order for Customer1 has been placed, the CMS can remove Customer1's name from the display for a predefined range of time.

In some embodiments, the CMS varies the amount of coffee grounds, used and the brewing time of the coffee based on the time of day and/or user preference. For example, as mentioned previously, at certain times of day a coffee shop can experience significantly increased traffic. During those times, to improve the timeliness of service, the CMS can automatically increase the amount of coffee grounds used and decrease the brewing time, while maintaining a similar quality and taste for the coffee. At slower times of the day, the CMS can automatically decrease the amount of coffee grounds used and increase the brewing time. The variations in amount of coffee grounds used and brewing time can be based on historical information and/or the number of current coffee requests. Thus, if Customer1 orders his large drip Sumatra at 9:00 a.m. on Tuesday, the CMS can automatically increase the amount of coffee grounds used and decrease the brewing time to make additional time for additional coffee requests. If Customer1 makes a similar order for his large drip Sumatra at 1:30 p.m. later that day, the CMS can automatically decrease the amount of coffee grounds used and increase the brewing time to conserve the coffee grounds being used. The brewing time can also be varied based on customer and/or user preference.

In certain embodiments, the CMS can vary the cleaning time of the coffee machine based on the time of day and usage details of the coffee machine. For example, and not to be construed as limiting, during busy times of day, such as in the morning, the cleaning time between each cup of coffee made by the coffee machine can be significantly reduced in order to increase the number of cups of coffee that can be made in a set amount of time. During the afternoon, the CMS can automatically increase the cleaning time for the coffee machine. The CMS can use historical information regarding the frequency of orders made and customer use and/or current coffee requests to determine the variation of cleaning time and frequency. In this regard, the CMS can improve the efficiency of the cleaning periods for the coffee machine. The CMS can also manage a staged cleaning cycle based on different groups of a product.

FIG. 1 is a block diagram illustrative of a cooking management environment 100 for the management of one or more cooking devices 102. As illustrated in FIG. 1, the cooking management environment 100 can include one or more cooking devices 102 and point-of-sale devices 103 in communication with a cooking management system (CMS) 106 via a communication network 104. As illustrated in FIG. 1, the cooking devices 102, point-of-sale devices 103, CMS 106, and communication network 104 can each be different devices. In some embodiments, the CMS 106 forms part of one or more cooking devices 102 and/or point-of-sale devices 103 and the communication network 104 is a local bus.

The cooking devices 102 can be any type of cooking device with the ability to communicate with the CMS 106 over the communication network 104. For example, the cooking devices 102 can include, but are not limited to, coffee machines, grinders, skillets, fryers, microwaves, ovens, mixers, blenders, and the like. Some embodiments of the cooking devices 102 are disclosed in U.S. Provisional Patent Application No. 61/563,185, filed on Nov. 23, 2011, and entitled APPARATUS, SYSTEMS, AND METHODS FOR BREWING A BEVERAGE, the entire content of which is hereby incorporated by reference in its entirety. In some embodiments, the cooking devices 102 can include diagnostic/troubleshooting tools with downloadable diagrams, flowcharts, etc. As a technician navigates the flowcharts, the cooking device 102 can report the technician's path. The flowchart can be updated based on unsuccessful pathways, most-likely outcomes, etc.

The point-of-sale devices 103 can include any electronic device that is used as part of the order placement process. For example, point-of-sale devices 103 can include, but are not limited to, point-of-sale terminals, cash registers, computers, electronic mobile devices, etc., as well as any combinations thereof. The point-of-sale devices 103 can be used to enter product requests, queue purchases, and/or communicate with the CMS 106 and/or cooking devices 102. In some embodiments, a point-of-sale device 103 only queues orders that have been received. In such an embodiment, the point-of-sale device 103 can communicate with one or more additional point-of-sale devices 103 to place the order. In certain embodiments, a customer's personal electronic mobile device can be used to place an order with another point-of-sale device 103, or with the cooking device 102. The order can be placed prior to arriving at the business, or while at the business location. Accordingly, the CMS 106 can queue the order (or product requests) remotely. In some embodiments, the point-of-sale device can display the status of the product request. For example, the point-of-sale device can indicate that the product will be ready in 30 seconds, one minute, etc. In certain embodiments, the point-of-sale device 103 is incorporated with the cooking device 102.

The communication network 104 can comprise any number of different networks including a wide area network, local area network, a satellite network, a cable network, a personal area network, or the like. The network can be a wireless network, wired network, or a combination thereof. In some embodiments, the communication network 104 can be the Internet or an intranet. In certain embodiments, such as when the CMS 106 is integrated with the cooking devices, the communication network 104 can be a local bus.

The CMS 106 illustrated in FIG. 1 corresponds to a logical association of one or more computing devices associated with the CMS 106. Specifically, in an illustrative embodiment, the CMS 106 can include an interface component 108, a customer identification component 110, a portion and cooking time component 112, a cleaning component 114, and a storage component or data storage device 116. The CMS 106 can be implemented using a microprocessor, micro-controller, or similar computing device capable of storing and executing instructions stored in a non-transitory storage medium. The CMS 106 can form part of a cooking device 102 or part of some other computing device, such as a cash register or other point-of-sale device 103. Additionally, the CMS 106 can be implemented and located in a central location of a building or commercial area and communicate with the cooking devices 102 via a wired or wireless local area network (LAN), etc. Alternatively, the CMS 106, or portions thereof, such as the data storage device 116, can be remotely located from the cooking devices 102, such as in a centralized location located many miles away from the cooking device and can communicate with the cooking devices 102 and/or point-of-sale devices 103 via wired or wireless communication via a WAN, such as the Internet. In some embodiments, the CMS 106 can be local to some cooking devices 102 and/or point-of-sale devices 103 and remote to other cooking devices 102 and/or point-of-sale devices 103, and any variation or combination thereof. In certain embodiments, such as when the data storage device 116 is remotely located from the cooking devices 102 and/or point-of-sale devices 103, only a subset of the customer data is communicated to a particular store location at a time. For example, a store may only receive thirty to ninety minutes of actionable customer data at a time. In this way, the devices at the store can be more responsive. Any changes to customer data can then be uploaded to the data storage device 116.

The interface component 108 can be used to send commands to the cooking devices 102 and receive product requests from a user, and the like. The interface component 108 can be configured to communicate with the cooking device 102 via the communication network 104. The interface component 108 can also translate the data received via the communication network 104 into a format understandable by the CMS 106 and vice versa. The interface component 108 can also be used to interface with a user of the CMS 106 and/or other devices. For example, the interface component can generate a user interface that allows a user to enter product requests, verify and/or select customer information, etc.

The customer identification component 110 can be used to identify one or more customers that place an order or that may place an order. The customer identification component 110 can identify the customer using historical and/or current information about that customer. For example, the customer identification component 110 can identify the customer based on a comparison of current temporal data with the temporal data of previous product requests that correspond to the customer (e.g., time of day, week, month, holiday, season, etc.). In certain embodiments, the customer identification component 110 can use location information of the customer, the product vendor, the cooking device 102, current product requests, and/or the previous product requests to identify the customer. For example, the customer identification component 110 can limit its review of previous product requests to the previous product requests that occurred at a specific location, or limit the number of possible customers by removing customers that have not visited, or infrequently visit, a particular location. In some embodiments, the customer identification component 110 identifies the customers based on a current product request in addition to the comparison of current temporal data with the temporal data of previous product requests that correspond to the customer.

In certain embodiments, once the customer identification component 110 has identified the customer, the customer identification component 110 causes a cooking device 102 to produce a product based on customer data of the identified customer. The customer identification component 110 can revise the customer data as the customer makes additional product requests or add new customer data for previously unknown customers. For example, if a customer requests a different product, or requests a product at a different time, the customer identification component 110 can update the customer data. As part of updating the customer data, the customer identification component 110 can update the customer rating to reflect any changes in visiting trends by the customer.

The portion and cooking time component 112 can be used to control the type and amount of constituent elements used for a product and the cooking time for the product. The constituent elements can include one or more of, but not limited to, coffee grounds, flavor additives, sweetener, water, creamer, and/or other liquid and/or dry ingredients for consumable products. The portion and cooking time component 112 can vary the portion of constituent elements and cooking time based on historical information relating to the number of product requests within a predefined range of time, or based on the number of current product requests. For example, when the number of product requests within the predefined range of time meets a threshold, the portion and cooking time component 112 can automatically increase the constituent elements used for the product and decrease the cooking time. In certain embodiments, such as those involving brewing a single cup of drip coffee, the cooking time is decreased to 30 seconds.

The cooking time component 112 can also vary the cooking time based on user preferences, such as a stronger/weaker cup of coffee, etc. In some embodiments, the portion and cooking time component 112 can automatically decrease the constituent elements used for the product and increase the cooking time when a threshold is met. In certain embodiments, the portion and cooking time component 112 can increase or decrease the portion of constituent elements used for the product and increase or decrease the cooking time when a threshold is met. Any variation or combination of the embodiments can be used by the portion and cooking time component 112 to vary the portion of constituent elements used and cooking time.

The cleaning component 114 can be used to determine the appropriate cleaning time and thoroughness of a cleaning cycle for the cooking devices 102. The cleaning time and thoroughness can be controlled based on historical information of previous product requests within a predetermined range of time or based on the number of current product requests within a predetermined range of time.

The CMS 106 can use the product requests to determine the appropriate cleaning times, frequencies, etc. When the number of product requests within a predefined range of time meets a threshold, the cleaning component 114 can automatically alter the cleaning times and/or cleaning frequencies. For example, when a large number of product requests are made within the range of time, the cleaning component 114 can automatically increase or decrease the cleaning time and/or frequency. Similarly, when a small number of product requests are made within the range of time, the cleaning component 114 can automatically increase or decrease the cleaning time and/or frequency. Moreover, the cleaning component 114 can dynamically monitor such customer requests and temporal data and make corresponding adjustments to the cleaning time and/or frequency for the cooking devices 102 accordingly. Even further, in yet other embodiments, whether the cleaning time and cleaning frequency is increased or decreased can alternatively be determined by a user. In some embodiments, when the threshold number of product requests is satisfied, the cleaning frequency can be increased and the cleaning time can be decreased. For example, during a busy period at a coffee shop, the coffee machine can be cleaned more frequently, but each cleaning cycle can use less time. In certain embodiments when the threshold number of product requests is satisfied, the cleaning frequency can be decreased and the cleaning time can be decreased. For example, during a busy period at a coffee shop, the coffee machine can be cleaned less frequently, and each cleaning cycle can use less time. In some embodiments, when a different threshold number of product requests is satisfied, the cleaning frequency can be increased and the cleaning time can be increased, etc. For example, during a slow period at a coffee shop, the coffee machine can be cleaned more frequently and each cleaning period can use more time. Any variation or combination of the embodiments can be used to vary the cleaning time and/or frequency, as desired.

One skilled in the relevant art will appreciate that the CMS 106 can be associated with various additional computing resources, such as usage components that indicate the amount of use by the cooking devices 102, such as the number of cups of coffee made by a coffee machine between cleanings or since activated, temperature components to control and indicate the temperature of the cooking devices 102, inspection components, invoice components, administrative components, servers, and the like.

The data storage device 116 can be used to store customer data, product requests, temporal data, and the like. The data storage device 116 can include customer data entries for each customer that visits the commercial establishment. Thus, the data storage device 116 can store information regarding hundreds, thousands, or even more customers. Each customer data entry can include the customer name, address, e-mail address, phone number, product requests, temporal data of the product requests, trends of product requests made by the customer, trends of frequency and timing of visits, additional data, and/or any variation or combination thereof. The product requests can include one or more of the type, size, amount, etc. of the product requested and can further include temporal data regarding the product request, such as when the product was requested.

The data storage device 116 can also include additional information regarding the product requests made by users generally. For example, the data storage device 116 can include one or more of information regarding frequency of product requests, analysis of busy and slow times of the commercial establishment during the day, week, month, season, and/or year, trending data of customers generally or different types of customers during different times of the day, week, month, season, and/or year, and the like. For example, the data storage device 116 can include information regarding trends of customers that order a large, drip coffee to convert to a medium, pumpkin spice latte during the fall season. The trending information can be used to make recommendations to individual customers or add a product as a prediction of a future order.

The data storage device 116 can reside locally on the same device as the CMS 106 or it can be located remotely and communicate with the CMS 106 via the communication network 104. Furthermore, the data storage device 116 can comprise one or many data storage devices, each device containing the same or different data. The data storage device 116 can be implemented using one or more non-transitory storage medium and can include computer-executable code.

One skilled in the relevant art will also appreciate that the components and configurations provided in FIG. 1 are illustrative in nature. Accordingly, additional or alternative components and/or configurations facilitating communication can be utilized. In some embodiments, the CMS 106 can include a queue management component. The queue management component can receive product requests and group the product requests based on product similarities. For example, the queue management component can group product requests based on different types of coffee beans used, cooking time, cooking heat, size, multi-cycle products, etc. The queue management component can also route the product requests to an appropriate cooking device 102 based on the groupings made. For example, decaffeinated coffee orders can be routed to a hopper designated as the decaffeinated hopper, while other drinks are routed elsewhere. As such, orders may not be in first-in first-out (FIFO) order. For example, if the decaffeinated hopper receives a large number of orders, while other hoppers receive fewer orders, the decaffeinated coffee orders may be slower. The queue management component can receive feedback from the cooking devices to revise how the product requests are routed.

In certain embodiments, the CMS 106 can recommend various tasks, such as cleanup, restocking items, etc., to the user based on the temporal data. In certain embodiments, the cleaning component 114 can recommend to the user to restock cups, utensils, napkins, or other products in preparation for an increase in customers and/or orders. Additionally, the various components associated with the CMS 106 can be located within a single device or can be distributed among a number of different devices. When distributed among a number of devices, the different devices can communicate via the communication network 104. In one embodiment, the CMS 106 and cooking device 102 can be located within a single device. In this, or any other embodiment, the data storage device 116 can be located locally or remotely. Thus, the CMS 106 100 can be arranged in any number of configurations without departing from the spirit or scope of the present description.

Figure 2A:
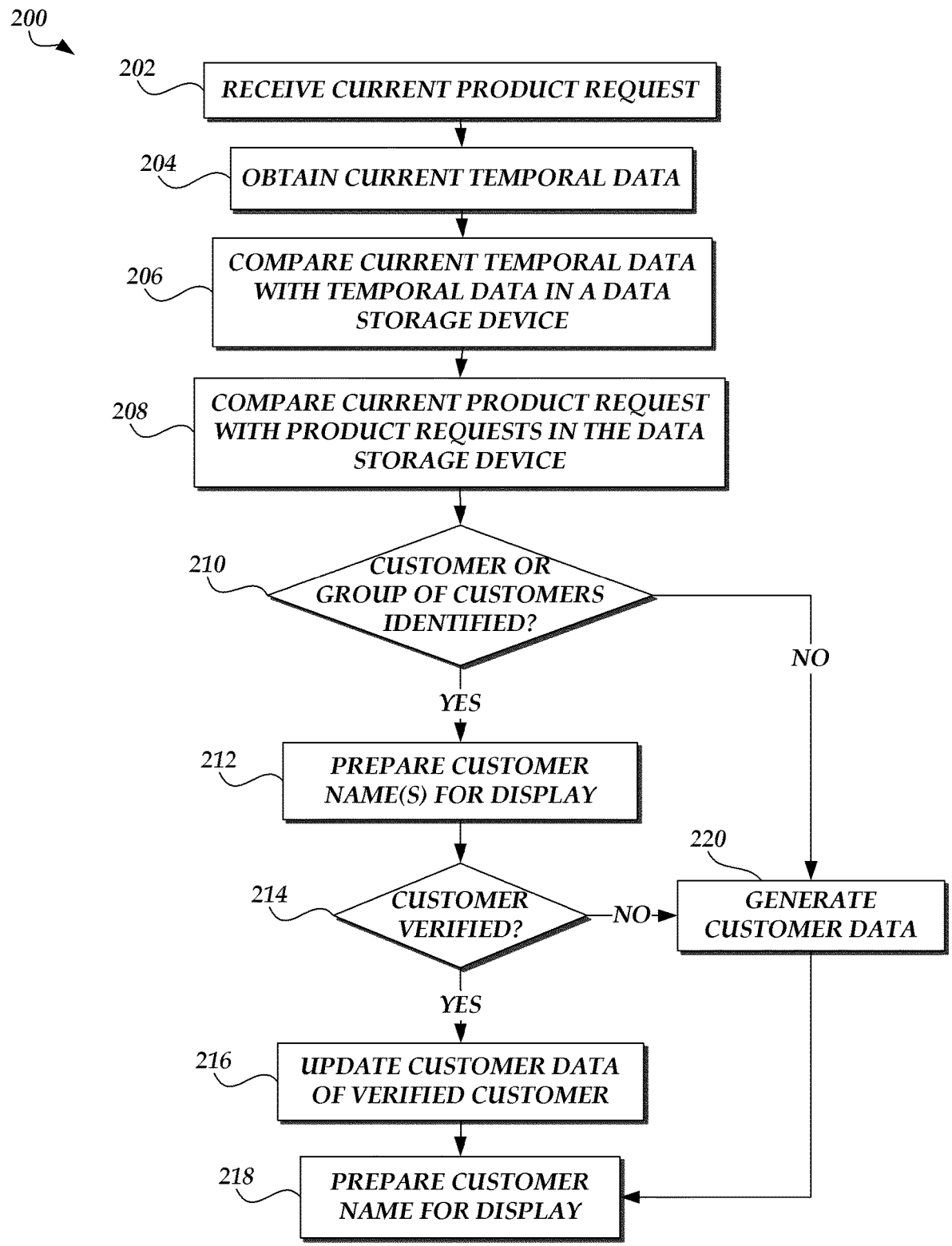
FIGS. 2A and 2B are flow diagrams illustrative of embodiments of routines implemented by the cooking management system of FIG. 1 for identifying a current customer.

FIG. 2A is a flow diagram illustrative of an embodiment of a routine 200 implemented by the CMS 106 for automatically identifying a customer. One skilled in the relevant art will appreciate that the elements outlined for routine 200 can be implemented by one or more computing devices/components that are associated with the CMS 106. Accordingly, routine 200 has been logically associated as being generally performed by the CMS 106. However, the following illustrative embodiments should not be construed as limiting.

At block 202, the CMS 106 receives a current product request. The current product request can be received via a computing device, such as a mobile computing device, a cash register, or other point-of-sale device, etc. The current product request can include information related to a particular product. The product can be a consumable product, such as a food or beverage item (e.g., coffee). In addition, the current product request can include one or more of quantity and size data of the product requested.

At block 204, the CMS 106 obtains current temporal data. The CMS 106 can obtain the current temporal data from an internal or external device, such as a clock, the internet, a user, another computing device, and the like. In one embodiment, the current temporal data can be provided by the computing device receiving the current product request. As discussed above, the temporal data can be associated with the current product request, and can be used to identify the date of the product request, the time of the product request, the day of the week of the product request, month information, holiday information, seasonal information, and the like.

At block 206, the CMS 106 compares the current temporal data with temporal data stored in the data storage device 116, such as temporal data associated with previous product requests. As discussed previously, the data storage device 116 can be located locally, such as within or near the cooking device 102, or can be remotely located, such as in a remote centralized storage location several miles from the cooking device 102. The temporal data in the data storage device 116 can include hundreds, thousands, or more temporal data entries. Each temporal data entry can be associated with a customer data entry of a customer. Thus, the data storage device 116 can include the temporal data and customer data of hundreds, thousands, or more customers.

The CMS 106 compares the temporal data in the data storage device 116 with the current temporal data to determine if any prior customers may be associated with the current product request. For example, if the current temporal data indicates the current product request was made at 9:00 a.m. on a Wednesday, the CMS 106 can compare that temporal data with the temporal data in the data storage device 116 to identify previous customers that made similar product requests at a similar time of day, day of week, etc.

At block 208, the CMS 106 compares the current product request with previous product requests stored in the data storage device 116. Similar to the temporal data stored in the data storage device 116, hundreds, thousands, or more product requests can be stored in the data storage device 116 and associated with the customer data entries of individual customers.

Each previous product request in the data storage device 116 can include information associated with the product requested by a customers. The previous product requests stored in the data storage device 116 can be used to indicate trends or patterns for customers generally and for individual customers regarding their frequency of visits, tendency to order a particular product at a particular time of day, day of the week, time of the year, etc. By comparing the current product request with previous product requests in the data storage device 116, the CMS 106 can automatically identify individual customers that may have made the current product request. By comparing both the current temporal data and the current product request with temporal data and previous product requests in the data storage device 116, the CMS 106 can identify customers that have made similar product requests at similar times of the day, days of the week, etc. Accordingly, the CMS 106 can automatically identify one or more customers that may have made the current product request. As customers make additional product requests, the data storage device 116 can include and review the additional product requests. The product requests can be used to modify trending data of the customer to improve the accuracy of the prediction. For example, if a customer begins to frequent the business in the afternoon instead of, or in addition to, the morning, the trend can be identified and the customer data updated accordingly.

At decision block 210, the CMS 106 determines whether one or more customers have been identified. The one or more customers identified can include those customers that have made a similar product request at a similar time of day, day of the week, time of the year, (e.g., similar temporal data) etc. to the current product request and current temporal data. In some embodiments, the similar product is the exact same order, such as a large drip Sumatra. In certain embodiments, the similar product is the same type, such as a Sumatra coffee, or the same size of order. In some embodiments, the similar temporal data includes temporal data within a range of time of the current temporal data. With continued reference to the example above regarding the current product request at 9:00 a.m. on a Tuesday, the CMS 106 can retrieve the names of customers that have made a similar product request at 9:00 a.m. (or within a range of time) on previous Tuesdays, or other days (workdays, weekends, etc.). In some embodiments, the CMS 106 returns the names of customers that have made a similar product request at times around those of 9:00 a.m. on workdays. For example, the CMS 106 can return a list of the names of all customers that have made a similar product request during any workday between 8:30 a.m. and 9:30 a.m., etc. Accordingly, the CMS 106 can return the names of customers that have made similar product requests at similar times of the day, day of week, etc.

In some embodiments, the CMS 106 uses a rating system to determine which customers are likely to have made the current product request. The rating system can take into account the information mentioned above, such as product request history and temporal data associated with the product requests, etc., as well as other information, such as user-defined preferences, to rate different customers. The customers with the highest ratings at a particular time can be displayed as desired. Each customer's rating can vary throughout the day based on his or her customer data (e.g., a higher customer rating for times when they are more likely to visit and lower customer ratings for times they are less likely to visit). The customer rating can also vary based on time of week, month, holiday, season, year, etc., based on the customer data. After each product request, the ratings of the different customers can be updated.

The CMS 106 can vary the range of time based on the number of customers identified. For example, if 20 or more customers are identified as having made a similar product request between 8:30 a.m. and 9:30 a.m., the CMS 106 can reduce the range from 8:45 a.m. to 9:15 a.m. In this manner, the CMS 106 can automatically identify a smaller group of customers that are more likely to have made a similar product request previously. Similarly, the CMS 106 can automatically expand the range of time if no customers, or an insufficient number of customers, are identified as having made a similar product request within the specified range of time.

If no customer or a group of customers is identified at decision block 210, the CMS 106 can generate new customer data, as illustrated at block 220. To generate the customer data, the CMS 106 can store the customer name, the product requested by the customer, as well as the current temporal data in the data storage device 116. Additional customer information can be stored in the data storage device 116, such as a phone number, address, e-mail address, credit/debit card information, and other identifying information of the customer. For example, the CMS 106 can create a customer profile for the customer based on the product request of the customer and current temporal data. Additional information can be added to the customer profile, such as phone number, address, e-mail address, image, preferences, relationship to other customers or contacts, and other identifying information. The additional information can be added when the customer data is generated or at a later time, such as a subsequent visit. For example, if a previous customer orders a different product on a subsequent visit, the CMS 106 can generate the new customer data related to the different product and associate the new customer data with the customer data associated with the customer that is already stored in the data storage device 116. The customer data can also be updated using information from a database, such as a customer loyalty database, etc. In some embodiments, the data storage device 116 is part of a customer loyalty database. Once the CMS 106 generates the customer data at block 220, the CMS 106 can prepare the customer name for display, as illustrated and discussed further below with respect to block 218.

On the other hand, if one or more customers have been identified at block 210, the CMS 106 can prepare the customer name or names for display, as illustrated at block 212. In preparing the customer names for display, the CMS 106 can transmit the appropriate information to a display device so that the display device can display the names. The display device may be part of a computing device used by a user in order to enter product requests, such as a cash register, mobile electronic device, etc. Alternatively, the display device can be a display device separate or apart from the computing device used to enter the product request, such as a TV screen or separate computer screen. In some embodiments, if a customer's name is repeatedly displayed, but never selected, the customer data for that customer can be updated to display less frequently or not at all.

Continuing at block 214, the CMS 106 determines if the customer has been verified. A user can verify the customer by selecting the customer's name from the display screen. For example, if Customer1 made the current product request, the product request was entered by an employee, and the CMS 106 caused a point-of-sale device 103 to display the name of Customer1, the employee can select the name of Customer1 on the point-of-sale device 103 to indicate that Customer1 made the current product request. The customer can be verified using a variety of methods. For example, a user, such as the employee, can click, touch, highlight, underline, touch a button corresponding to the customer's name, writing the customer's name on an electronic device, or otherwise indicate in some fashion that the customer placing the order request is Customer1. The user can write the customer's name on the electronic device using a writing utensil, such as a stylus, a finger, etc. If the customer is not verified, the CMS 106 generates customer data as illustrated at block 220, and described in greater detail above.

At block 216, the CMS 106 updates the customer data of the verified customer. The CMS 106 can update the customer data by including the current temporal data and current product request with the customer data for the verified customer that is already stored in the data storage device 116. In some embodiments, if the customer selects a different product, the different product information can be stored. In certain embodiments, when updating the customer data, the CMS 106 removes the customer from a list of potential customers that may have placed the current product request. In this way, once the customer has placed an order within a particular range of time, the customer's name will no longer surface until the range of time has passed. For example, when Customer1 places an order on Monday at 9:00 a.m., Customer1's name will not surface until after an allotted time has passed, such as three hours or some other predetermined time. The range of time can be fixed for multiple customers or can be dynamically determined based on individual customer data. For example, if a customer typically visits a business multiple times a day, the range of time can be thirty minutes, one hour, or multiple hours, as desired. If a customer typically only visits once a day, the range of time can be longer, such as twelve or eighteen hours. Further embodiments can include any combination or variation of the embodiments described herein.

In addition, the CMS 106 can extrapolate information from the updated customer data, such as an average time, or times, of day in which the customer frequents the business, the range of time at which the customer is typically ordering at the business, the days of the week when the customer requests a product, and the like. The CMS 106 can also store information regarding which products the customer prefers and track the frequency of the selection of those products. If the customer requests different products, the CMS 106 can determine if the product requests differ based on time of day, week, month, season, holiday, year, etc. The CMS 106 can track the frequency of the different product requests. For example, the CMS 106 can identify whether a particular customer prefers a breakfast sandwich in the mornings, cheeseburger with milkshake and fries in the afternoons, and chicken fingers with tater tots in the evening. As another example, the CMS 106 can identify whether a customer prefers a large drip coffee of a particular type in the morning, an espresso in the afternoon, and a hot chocolate in the evening. The CMS 106 can also identify if a customer regularly prefers a cappuccino during workdays, but prefers an iced coffee in June and July, a pumpkin spice latte during October and November, and a decaf coffee on the weekends. Accordingly, the CMS 106 can identify any combination or variation of customer preferences using customer data. In addition, the CMS 106 can use the customer data to predict future orders of different products, or suggest different products for the customer. For example, the CMS 106 can indicate to a user to offer a pumpkin spice cappuccino to a customer during November as an alternative to the pumpkin spice latte.

At block 218, the CMS 106 prepares the customer name for display. The customer name can then be displayed on the display device. The customer name can be displayed as a printed name, or an image of the name written by the user on the electronic device, a stored image associated with the customer, etc. In some embodiments, the name can be printed on the product and/or printed and affixed to the product as desired. The display device may be the same display device as used earlier to verify the customer name, or can be a different display device, such as a display device on the cooking device 102.

Additional, fewer, or different blocks can be used to implement the process 200 without departing from the spirit and scope of the description. For example, in some embodiments, the current temporal data and stored temporal data can be compared after the current product request and stored product requests. In certain embodiments, the current temporal data and stored temporal data can be compared in parallel with the current product request and stored product requests. In some embodiments, the CMS 106 varies the range of time used to identify customers that have made similar product requests with similar temporal data until at least one customer is identified.

Figure 2B:
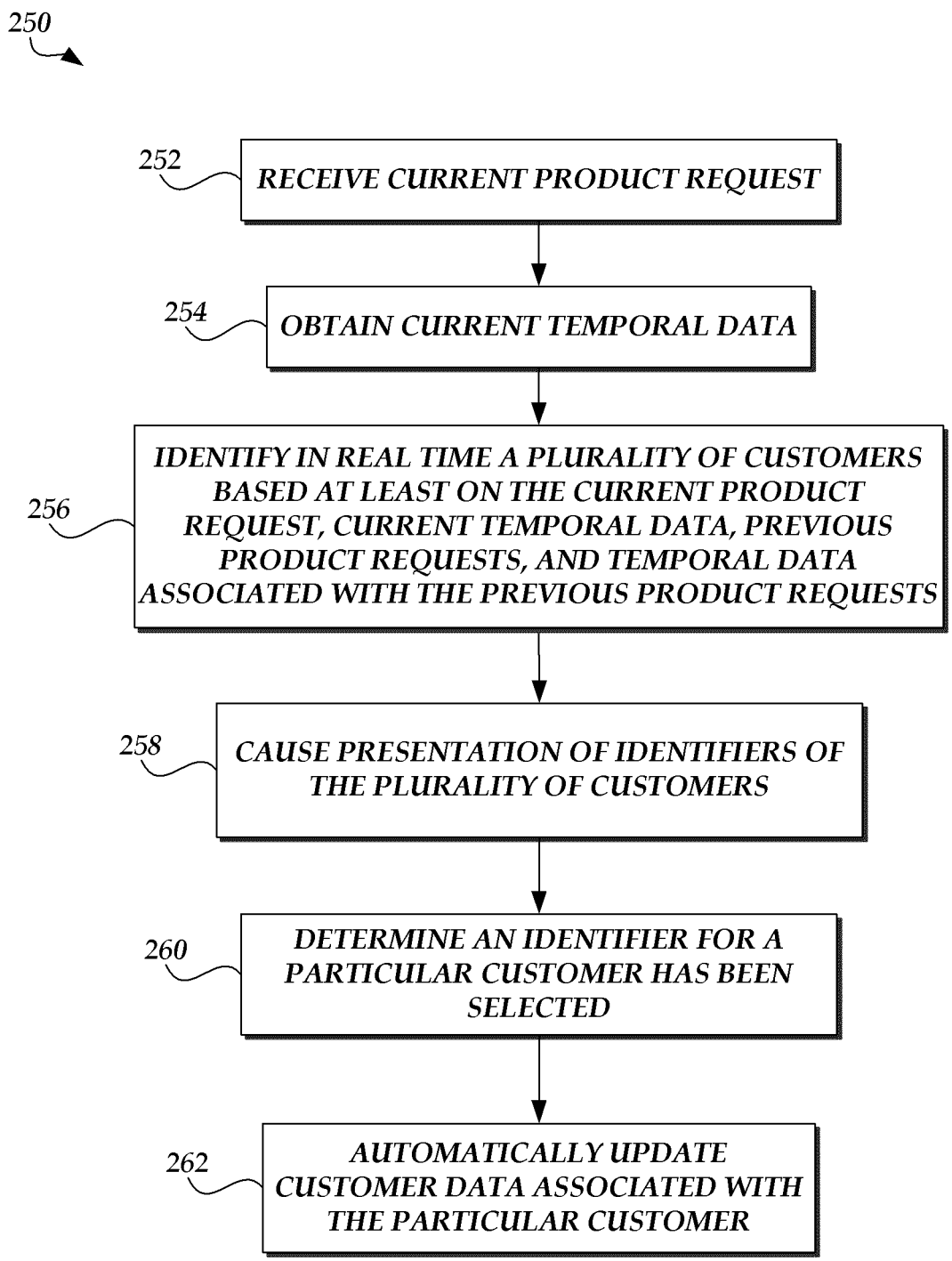

FIG. 2B is a flow diagram illustrative of an embodiment of a routine 250 implemented by the CMS 106 for automatically identifying a customer, similar to routine 200 of FIG. 2A. One skilled in the relevant art will appreciate that the elements outlined for routine 250 can be implemented by one or more computing devices/components that are associated with the CMS 106. Accordingly, routine 250 has been logically associated as being generally performed by the CMS 106. However, the following illustrative embodiments should not be construed as limiting. Furthermore, any of the embodiments described below with reference to FIG. 2B can be implemented with and/or interchanged with any of the embodiments described above with reference to FIG. 2A.

At block 252, the CMS 106 receives a current product request, and at block 254 the CMS 106 obtains current temporal data, as described in greater detail above with reference to blocks 202 and 204 of FIG. 2A. At block 256, the CMS 106 identifies in real time one or more customers associated with previous product requests based at least on the current product request, the current temporal data, the previous product requests, and temporal data associated with the previous product requests. In some embodiments, the previous product requests occur during a predetermined range of time. In certain embodiments, the CMS 106 can identify the customers based on a comparison of the current product request with the previous product requests, and a comparison of the current temporal data with the temporal data associated with the previous product requests, as described in greater detail above with reference to blocks 206 and 208 of FIG. 2A.

In certain embodiments, the CMS 106 identifies customers associated with previous product requests that are similar to the current product request and that occurred during the predetermined range of time. The predetermined range of time can be based on the current temporal data. For example, if the current temporal data is 9:00 a.m. on a Wednesday, the predetermined range of time can be +/−fifteen minutes, thirty minutes, one hour, etc. (e.g., 8:45-9:15 a.m., 8:30-9:30 a.m., 8:00-10:00 a.m.) during working days (e.g., Monday-Friday), or any day of the week, etc.

The CMS 106 can then identify previous product requests for products similar to the product requested in the current product request that occurred during the predetermined range of time. The similar products can be based on a size of the product ordered, type of product ordered, products that are frequently interchanged with one another, etc. With continued reference to the example, if the current product request is for a large, drip Sumatra, the CMS 106 can identify previous product requests for large, drip Sumatras, Sumatras (regardless of size), or other products determined to be interchangeable with a Sumatra, and that occurred during the predetermined range of time.

As described in greater detail above with reference to FIG. 2A, each previous product request can be stored in the data storage device 116 and associated with a customer that requested a particular product. Thus, once the CMS 106 identifies the previous product requests that occurred during the predetermined range of time, the CMS 106 can identify the customers associated with the identified previous product requests. In addition, as described in greater detail with reference to FIG. 2A, the CMS 106 can vary the range of time based on the number of customers identified, the CMS 106 use the product requests to identify trends of the customer, the CMS 106 use a rating system to rate the customers, etc.

At block 258, the CMS 106 can cause presentation of identifiers associated with the identified customers on a display, as described in greater detail above with reference to block 212 of FIG. 2A. At block 260, the CMS 106 determines that the identifier for a particular customer has been selected. The CMS 106 can determine that the identifier for a particular customer has been selected based at least on a selection by a user of the identifier associated with the customer. For example, a user, such as the employee, can click, touch, highlight, underline, touch a button corresponding to the identifier, writing the identifier on an electronic device, or otherwise indicate in some fashion the identity of the customer placing the order, as described in greater detail above with reference to block 214 of FIG. 2A.

At block 262, the CMS 106 automatically updates the customer data associated with the particular customer, as described in greater detail above with reference to block 262 of FIG. 2B. As further described with reference to block 262 of FIG. 2B, the CMS 106 can extrapolate information from the updated customer data.

Additional, fewer, or different blocks can be used to implement the process 250 without departing from the spirit and scope of the description. For example, as mentioned, the blocks of process 250 can be interchanged with and/or used with the blocks of process 200. Furthermore, in some embodiments, the CMS 106 varies the range of time used to identify customers that have made similar product requests with similar temporal data until at least one customer is identified.

Figure 3A:
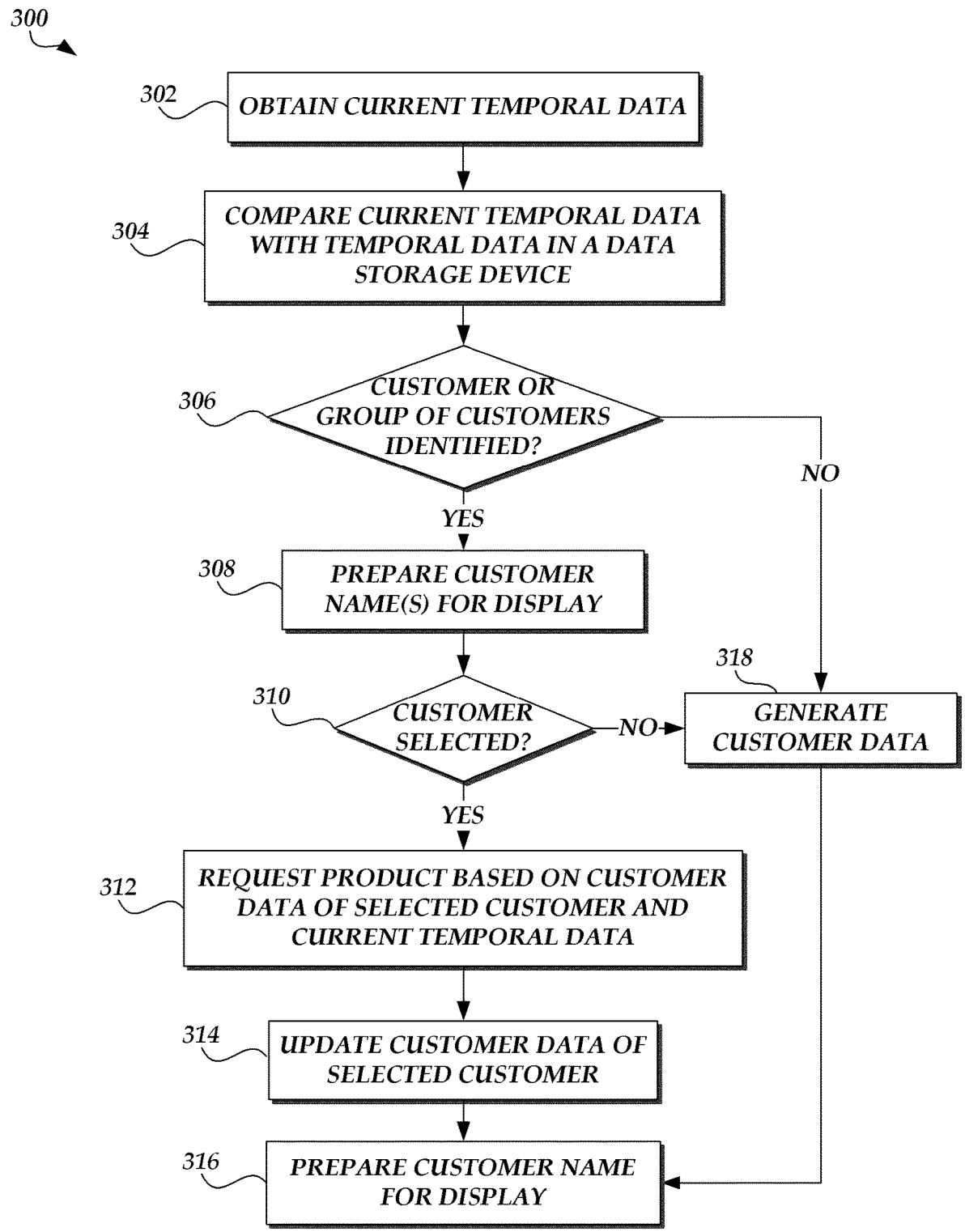
FIGS. 3A and 3B are flow diagrams illustrative of embodiments of routines implemented by the cooking management system of FIG. 1 for requesting a product based on customer identification.

FIG. 3A is a flow diagram illustrative of an embodiment of another routine 300 implemented by the CMS 106. Routine 300 is directed to requesting a product based on an identification of a customer. For example, routine 300 can be used by CMS 106 to automatically identify a customer using historical information about that customer, predict the product that the customer will order based on the historical information, and order the predicted product for the customer. One skilled in the relevant art will appreciate that the elements outlined for routine 300 can be implemented by one or many computing devices/components that are associated with the CMS 106. Accordingly, routine 300 has been logically associated as being generally performed by the CMS 106. However, the following illustrative embodiments should not be construed as limiting.

At block 302, the CMS 106 obtains current temporal data. As discussed above, with reference to block 204 of FIG. 2A, the current temporal data can include one or more of the current time of day, day of week, month, whether it is a holiday, and other information. The CMS 106 can obtain the current temporal data from an internal or external clock, the internet, a user, another computing device, the cooking device, etc.

At block 304, the CMS 106 compares current temporal data with temporal data associated with previous product requests and stored in the data storage device 116. As discussed previously with reference to block 206 of FIG. 2A, the data storage device 116 can include hundreds or thousands of individual customer data entries associated with individual customers. The customer data for each customer can include a number of pieces of information regarding the customer. For example, the customer data entry can include one or more of previous product requests made by the customer and temporal data associated with the previous product requests. The temporal data associated with the previous product requests can include the date and time of the previous product request. The customer data can also include a rating that takes into account the information mentioned above, as well as other information, such as user-defined preferences. As additional product requests are made by the customer, the rating can be modified.

At decision block 306, the CMS 106 determines whether a customer or a group of customers have been identified. The customer or group of customers can be automatically identified using the current temporal data, the temporal data associated with previous product requests, and/or the customer rating, stored in the data storage device 116. The customer data containing temporal data similar to the current temporal data can be used by the CMS 106 to identify the one or more customers. In some embodiments, the customer's having the highest customer rating for a particular time can be used to identify the one or more customers. The particular time can take into account any type of temporal data.

In some embodiments, various ranges of time can be used to identify the different customers. For example, if the current temporal data is Wednesday at 8:00 a.m., temporal data stored in the data storage device 116 that contains information regarding Wednesday between 7:30 a.m. and 8:30 a.m. can be used to identify one or more customers. In certain embodiments, the day of the product request is not used. In some embodiments, days of the week are grouped, such as weekdays, weekends, holidays, etc. Thus, the customer data entries that contain temporal data with information related to Wednesday between the hours of 7:30 a.m. and 8:30 a.m. can automatically provide a customer name. The customer name can be used by the CMS 106 to identify the customer.

Similarly, multiple customers or a group of customers can be identified. In some embodiments the CMS 106 can automatically expand and/or contract the range of time used to identify customers. For example, if 100 customers are identified as having made a purchase between the hours of 7:30 a.m. and 8:30 a.m., the CMS 106 can contract the range of time to 7:45 to 8:15 a.m., or to 7:30 a.m. and 8:30 a.m. on a workday, weekend, specific day or days of the week, etc. If still too many customer names appear, the CMS 106 can further contract the range of time automatically until an appropriate number of customers are identified. The appropriate number of customers identified can be a predefined number based on historical information, data analysis, or user preference. The CMS 106 can also expand the range of time automatically if too few or no customers are identified as having made a purchase request during the range of time specified.

Once the appropriate number of customers have been identified, the CMS 106 can prepare the customer names for display, as illustrated in block 308. To prepare the customer names for display, the CMS 106 can transmit the names to a display device or computing device for display. As mentioned previously with reference to block 212 of FIG. 2A, the display device, can be a TV screen, computer screen, mobile electronic device, a headset, virtual reality glasses, or other device capable of displaying the name or names of the customer(s). In certain embodiments, the display device can prompt the user with the name of the customer. In some embodiments, indications of multiple products can be displayed along with the customer. For example, if a customer typically selects between three products, an indication for each of the three products can be displayed. As part of the customer selection, the user, such as an employee, can select a product based on the customer's current preference.

At decision block 310, the CMS 106 determines whether a customer has been selected. The customer can be selected from the customer names on the display device. For example, a user, such as an employee, may click on, enter, highlight, touch, underline, touch a button corresponding to the customer's name, writing the customer's name on an electronic device, or otherwise interact with the display device in order to select a customer.

If no customer is selected, such as the names displayed do not contain the name of a customer that will request a product, the CMS 106 can generate new customer data, as illustrated in block 318. In generating the customer data, the CMS 106 can include the temporal data associated with the current product request, as well as other information associated with a customer, as described in greater detail above with reference to block 220 of FIG. 2A. For example, the CMS 106 can include one or more of the name, e-mail address, mailing address, phone number, and other information that can distinguish the customer from other customers, and/or create a customer profile using the received information.

On the other hand, if the CMS 106 determines that a customer is selected, the CMS 106 requests a product based on the customer data of the selected customer and the current temporal data, as illustrated in block 312. The customer data of the selected customer can contain the one or more products that the customer typically orders at a certain time of day, day of the week, and the like. For example, if the selected customer typically requests a large black coffee on Tuesdays and Thursdays between the hours of 8:00 a.m. and 9:00 a.m. and the current temporal data indicates that it is a Tuesday or Thursday between the hours of 8:00 a.m. and 9:00a.m., the CMS 106 can request that a large black coffee be made by a coffee machine. Accordingly, the CMS 106 is able to automatically determine the product that will likely be requested by a customer based on historical information collected about that customer. Furthermore, the customer data may indicate that the selected customer orders a large mocha on Tuesdays and Thursdays between the hours of 2:00 p.m. and 3:00 p.m. Accordingly, if the current temporal data indicates that it is a Tuesday or a Thursday between the hours of 2:00 p.m. and 3:00 p.m., the CMS 106 can request that a large mocha be made by a coffee machine. The CMS 106 can also provide a user, such as an employee, with a selection of products if the customer does not always order the same product. For example, if a customer typically orders between two or more drinks, the CMS 106 can present the selection of the two or more drinks to the user. The user can then select between the options.

Once the CMS 106 has requested the product based on the customer data of the selected customer, the CMS 106 updates the customer data of the selected customer, and prepares the customer name for display as illustrated in blocks 314 and 316, respectively, and as further described above with reference to blocks 216 and 218, respectively, of FIG. 2A.

Additional, fewer, or different blocks can be used to implement the routine 300 without departing from the spirit and scope of the description. For example, in some embodiments, the CMS 106 can vary the range of time used to identify customers until at least one customer is identified. Furthermore, the steps can be rearranged in a different order or implemented in parallel. For example, the CMS 106 can request the product and update the customer data in parallel, etc.

Figure 3B:
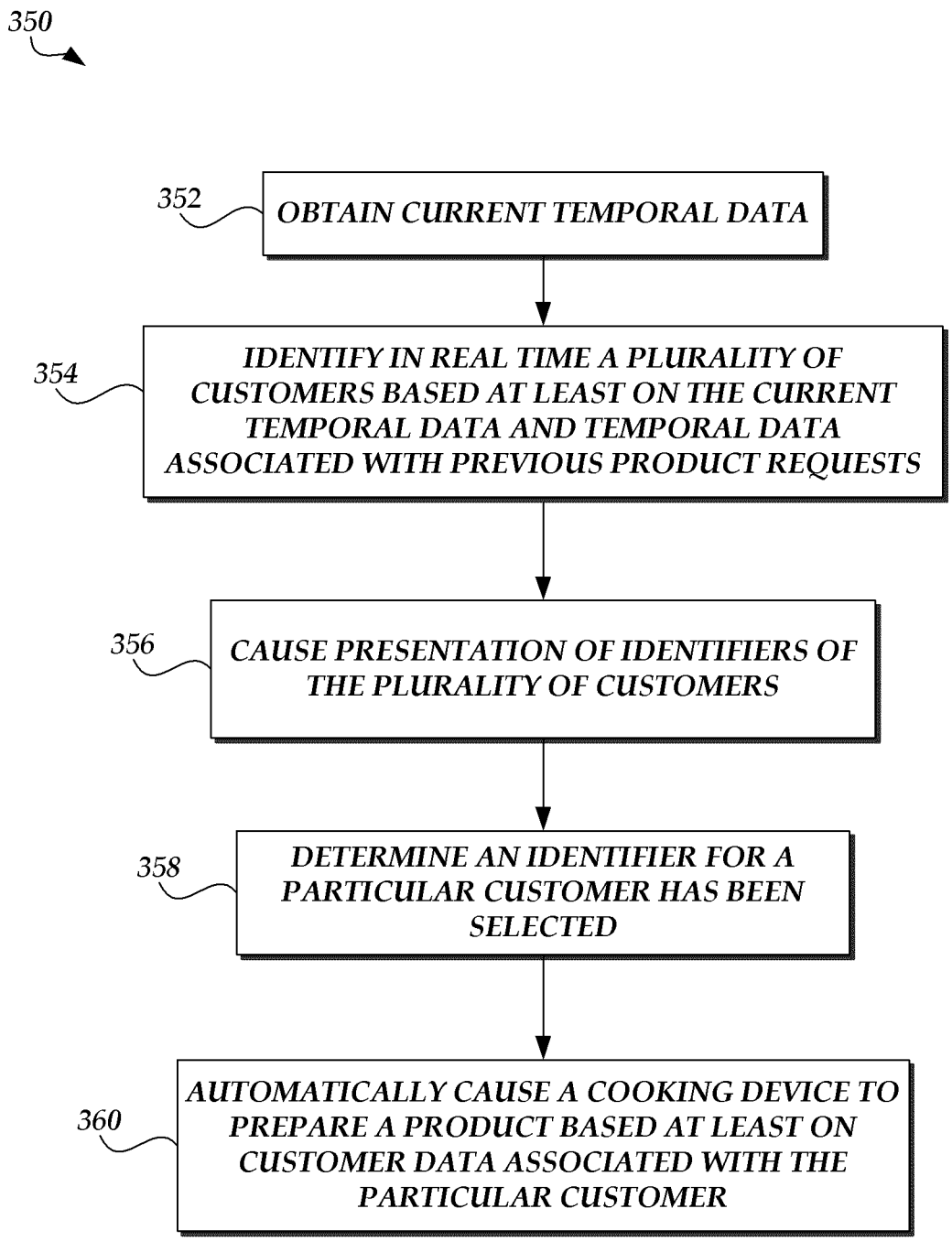

FIG. 3B is a flow diagram illustrative of an embodiment of routine 350 implemented by the CMS 106. Routine 350 is directed to requesting a product based on an identification of a customer, similar to routine 300 of FIG. 3A. One skilled in the relevant art will appreciate that the elements outlined for routine 350 can be implemented by one or many computing devices/components that are associated with the CMS 106. Accordingly, routine 350 has been logically associated as being generally performed by the CMS 106. However, the following illustrative embodiments should not be construed as limiting. Furthermore, any of the embodiments described below with reference to FIG. 3B can be implemented with and/or interchanged with any of the embodiments described above with reference to FIG. 3A.

At block 352, the CMS 106 obtains current temporal data. As discussed above, with reference to block 204 of FIG. 2A, the current temporal data can include one or more of the current time of day, day of week, month, whether it is a holiday, and other information. The CMS 106 can obtain the current temporal data from an internal or external clock, the internet, a user, another computing device, the cooking device, etc.

At block 354, the CMS 106 identifies in real time customers associated with previous product requests based at least on the current temporal data and temporal data associated with the previous product requests. In certain embodiments, the customers are identified based on a comparison of the current temporal data with temporal data associated with the previous product requests stored in the data storage device 116, as described in greater detail above with reference to block 304 of FIG. 3A.

In certain embodiments, the CMS 106 identifies customers associated with the previous product requests by identifying previous product requests that occurred during a predetermined range of time. As described in greater detail above with reference to FIGS. 2A, 2B, and 3A, the predetermined range of time can be based on the current temporal data. Furthermore, the CMS 106 can vary the predetermined range of time based on the number of customers identified, as described in greater detail above with reference to FIGS. 2A, 2B, and 3A.

At block 356, the CMS 106 causes presentation of identifiers associated with the customers on a display, as described in greater detail above with reference to block 258 of FIG. 2B and block 308 of FIG. 3A. At block 358, the CMS 106 determines that the identifier for a particular customer has been selected. The CMS 106 can determine that the identifier for a particular customer has been selected based at least on a selection by a user of the identifier associated with the customer. For example, a user, such as the employee, can click, touch, highlight, underline, touch a button corresponding to the identifier, writing the identifier on an electronic device, or otherwise indicate in some fashion the identity of the customer placing the order, as described in greater detail above with reference to block 310 of FIG. 3.

At block 360, the CMS 106 requests a product based on customer data associated with the particular customer. The customer data of the selected customer can contain the one or more products that the customer typically orders at a certain time of day, day of the week, and the like. Thus, the product requested by the CMS 106 can also be based at least in part on the current temporal data. For example, if the selected customer typically requests a large black coffee on Tuesdays and Thursdays between the hours of 8:00 a.m. and 9:00 a.m. and the current temporal data indicates that it is a Tuesday or Thursday between the hours of 8:00 a.m. and 9:00 a.m., the CMS 106 can request that a large black coffee be made by a coffee machine. Accordingly, the CMS 106 is able to automatically determine the product that will likely be requested by a customer based on historical information collected about that customer. Furthermore, the customer data may indicate that the selected customer orders a large mocha on Tuesdays and Thursdays between the hours of 2:00 p.m. and 3:00 p.m. Accordingly, if the current temporal data indicates that it is a Tuesday or a Thursday between the hours of 2:00 p.m. and 3:00 p.m., the CMS 106 can request that a large mocha be made by a coffee machine. The CMS 106 can also provide a user, such as an employee, with multiple products if the customer does not always order the same product. For example, if a customer typically orders between two or more drinks, the CMS 106 can present the selection of the two or more drinks to the user. The user can then select between the options.

Additional, fewer, or different blocks can be used to implement the routine 350 without departing from the spirit and scope of the description. For example, as mentioned, the blocks of process 250 can be interchanged with and/or used with the blocks of process 200. Furthermore, in some embodiments, the CMS 106 can vary the range of time used to identify customers until at least one customer is identified. In addition, the steps can be rearranged in a different order or implemented in parallel. For example, the CMS 106 can request the product and update the customer data in parallel, etc. Furthermore, the CMS 106 can update the customer data and display an identifier of the customer, as described in greater detail above with reference to blocks 314 and 316, respectively, of FIG. 3A.

Figure 4:
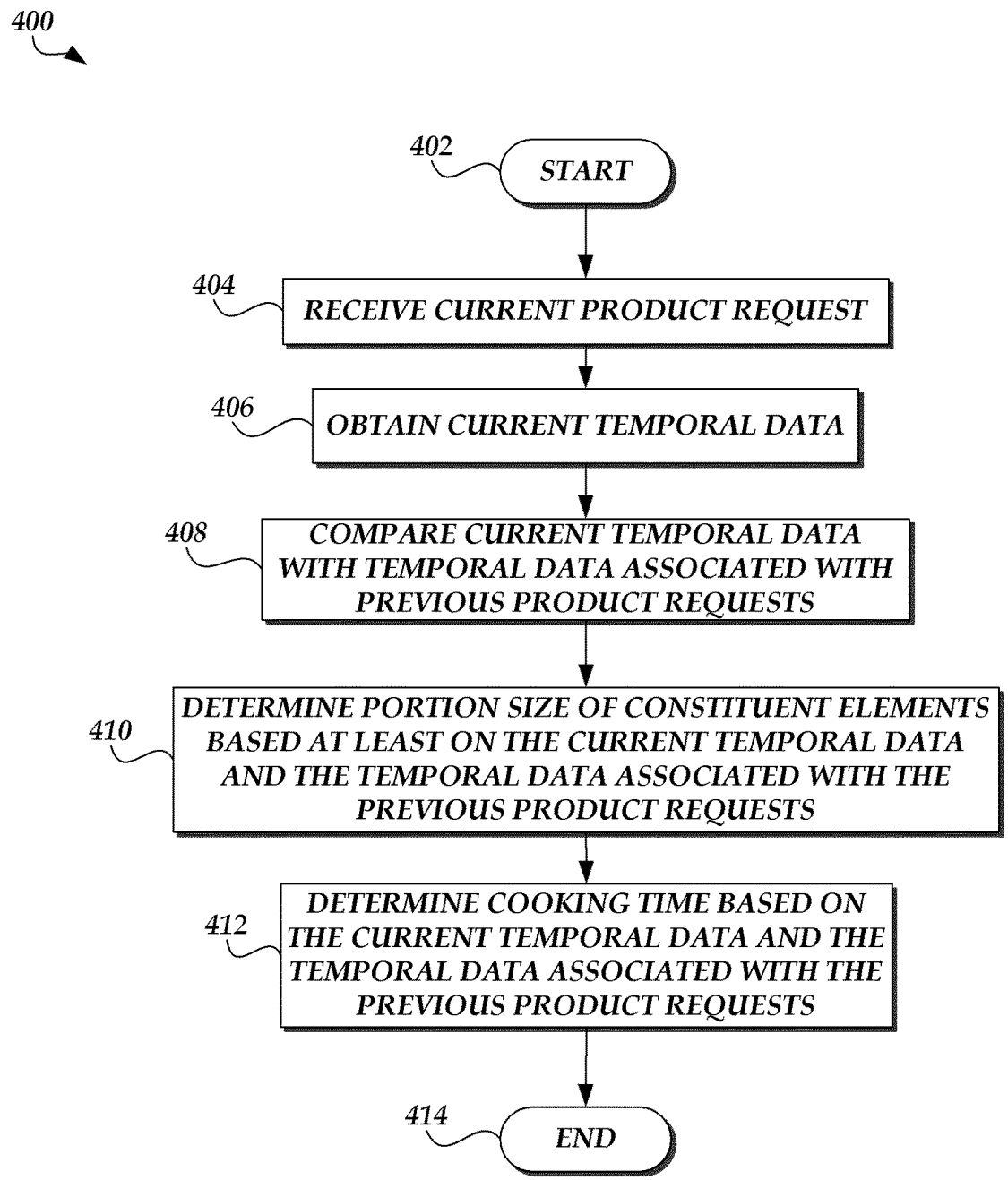
FIG. 4 is a flow diagram illustrative of an embodiment of a routine implemented by the cooking management system of FIG. 1 for determining a portion size of constituent elements and a cooking time based on temporal data.

FIG. 4 is a flow diagram illustrative of an embodiment of a routine 400 implemented by the CMS 106 for automatically determining a portion size of constituent elements and automatically determining a cook time based on current temporal data and temporal data associated with previous product requests. One skilled in the relevant art will appreciate that the elements outlined for routine 400 can be implemented by one or more computing devices/components that are associated with the CMS 106. Accordingly, routine 400 has been logically associated as being generally performed by the CMS 106. However, the following illustrative embodiments should not be construed as limiting.

At bock 402, the CMS 106 begins routine 400. At block 404, the CMS 106 receives a current product request, and at block 406, the CMS 106 obtains current temporal data similar to blocks 202 and 204, respectively, of FIG. 2A.

At block 408, the CMS 106 compares the current temporal data with temporal data associated with previous product requests stored in the data storage device 116. The temporal data can include data relating to one or more of the time of day, day of week, etc. of the previous product requests. The temporal data associated with the previous product requests can be used to identify busy times of the day, week, month, or year. This information can then be used to automatically determine a portion size and cooking time for a product. For example, coffee shops can receive a large influx of customers during the morning hours and a relatively small influx of customers during the later morning and early afternoon hours. During peak busy times, a coffee shop can increase the portion size of coffee grounds used and decrease the brewing time of the coffee in order to make a faster cup of coffee. During less busy times, the coffee machine can decrease the portion size of the coffee grounds and increase the brewing time in order to make coffee having similar quality and taste as the coffee made in less time, while conserving the coffee grounds.

Accordingly, at block 410 the CMS 106 automatically determines the portion size of constituent elements based on current temporal data and the temporal data associated with the previous product requests. The constituent elements can include one or more of, but are not limited, to coffee grounds, flavor additives, sweetener, water, creamer, and/or other ingredients for consumable products. Using this information, the CMS 106 can automatically determine the appropriate portion size of constituent elements for the product. As discussed above, during peak eating or product request times, a larger portion of constituent elements can be used in order to reduce the required cooking time of the product. During peak rush times the portion size can be increased, while during off peak times the portion size can be reduced. The CMS 106 can use a look-up table to determine the appropriate portion size based on current temporal data, and/or previous product requests.

At block 412, the CMS 106 automatically determines the cooking time based on the current temporal data and the temporal data associated with the previous product requests. As mentioned above, the CMS 106 can decrease the cooking time when the portion size is increased based on the current temporal data and the temporal data associated with the previous product requests. The portion size and cooking time can vary based on the time of day, day of week, holiday status, month, year, season, etc. The CMS 106 can use a look-up table to determine the appropriate cooking time based on portion size, current temporal data, and/or the temporal data associated with the previous product requests. At block 414, routine 400 ends.

Additional, fewer, or different blocks can be used to implement the routine 400 without departing from the spirit and scope of the description. In some embodiments, the CMS 106 can determine the cook time based on the portion size of the constituent elements. In certain embodiments, the CMS 106 can determine the cooking time of the product to determining the portion size of the constituent elements, and the portion size can be determined based on the cooking time. In some embodiments, the CMS 106 determines the portion size and cooking time simultaneously or in parallel. Furthermore, in some embodiments, block 408 can be omitted and the CMS 106 can determine the portion size of constituent elements based at least on the current temporal data and the temporal data associated with the previous product requests.

In some embodiments, the CMS 106 can control the cooking device to allocate the determined portion size and then cook the product for the determined cooking time. In certain embodiments, the CMS 106 determines the portion size and cooking time based on current product request information. For example, if the number of product requests meets a threshold value within a predefined range of time, the CMS 106 alters the portion size and cooking time. The threshold value can be a high threshold or low threshold. In some embodiments, when the product requests meet the threshold value, the CMS 106 can increase the portion size and decrease the cooking time. However, the CMS 106 can implement any variation or combination of increasing/decreasing portion size and increasing/decreasing cooking time when the threshold value is met, as desired.

Figure 5:
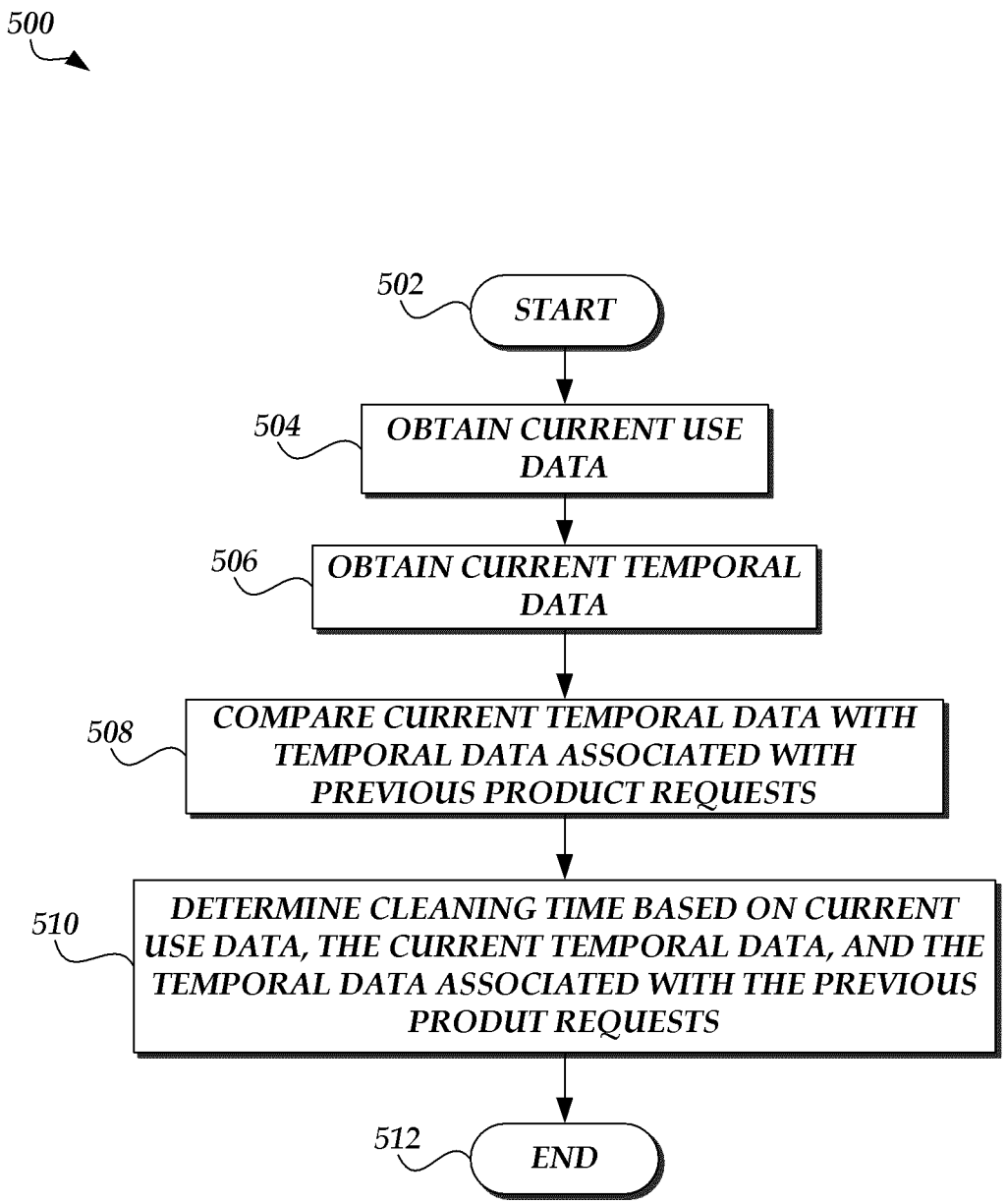
FIG. 5 is a flow diagram illustrative of an embodiment of a routine implemented by a cooking management system of FIG. 1 for determining a cleaning time of a cooking device based on temporal data.

FIG. 5 is a flow diagram illustrative of another embodiment of a routine 500 implemented by the CMS 106 for automatically determining a cleaning time based on current use data, current temporal data, and previous product requests. One skilled in the relevant art will appreciate that the elements outlined for routine 500 can be implemented by one or more computing devices/components that are associated with the CMS 106. Accordingly, routine 500 has been logically associated as being generally performed by the CMS 106. However, the following illustrative embodiments should not be construed as limiting.

At block 502, the CMS 106 initiates routine 500. At block 404, the CMS 106 obtains current use data of a cooking device. The current use data can include, but is not limited to, the amount of use by the cooking device, the amount of time the cooking device has been used for consecutive periods or it has been powered on, the number of products prepared or made by the cooking device, the amount of time that has elapsed since the last cleaning, the amount of product that has been made since the last cleaning time, an analysis of any residue on the cleaning device, etc. At block 506, the CMS 106 obtains current temporal data similar to block 204 of FIG. 2A.

At block 508, the CMS 106 compares current temporal data with temporal data associated with previous products requests stored in the data storage device 116, similar to block 408 of FIG. 4. The comparison of previous product requests with current temporal data can be used to identify an average number of product requests during similar times of day, week, season, etc., or to determine an expected amount of customer traffic at the current time, and the like. In some embodiments, the similar times include a predetermined range of time. The range of time can be based on an analysis of previous product requests and can be changed as desired.

At block 510, the CMS 106 automatically determines a cleaning time based on the current use data, current temporal data, and the temporal data associated with the previous product requests. The cleaning time can vary based on current use data, the current temporal data and the previous product requests. For example, during busy times, such as the morning, the CMS 106 can determine that a shorter cleaning time and/or more or less frequent cleanings should be used.

During slower periods, such as the afternoon or at night, the CMS 106 can determine that a longer cleaning time or more thorough cleaning cleanings should be used on the cooking device. In addition, during the slower periods, the CMS 106 can indicate and/or request less frequent cleanings. For example, during a busy time of day a coffee machine in a coffee shop can be automatically cleaned after several cups of coffee have been made, so long as the cups of coffee made are the same. Alternatively, the coffee machine can be automatically cleaned between each cup of coffee regardless of the type of coffee made. During slow times the coffee machine can be automatically cleaned after each cup of coffee. In some embodiments, during peak usage times, the CMS 106 can allocate relatively short cleaning periods for the cleaning of the coffee machine. During slow periods, the CMS 106 can allocate longer and/or more thorough cleaning periods for cleaning the coffee machine. Accordingly the cleaning time and thoroughness can vary based on the current usage of the cooking device, the current time of day, week, month, or year and the previous product requests, etc. In some embodiments, the cleaning can be based on one or more predefined factors, such as number of uses since last cleaning and current time of day. The CMS 106 can use a look-up table to determine the cleaning time and frequency for the coffee machine. The look-up table can account for types of product, temporal data, and the like.

Additional, fewer, or different blocks can be used to implement the routine 500 without departing from the spirit and scope of the description. For example, the CMS 106 can determine the cleaning time and frequency based on current product requests. In certain embodiments, if the number of product requests meets a threshold value within a predefined range of time, the CMS 106 can alter the cleaning time and frequency. The threshold value can be a high threshold or low threshold. In some embodiments, when the product requests meet the threshold value, the CMS 106 can increase cleaning time and decrease the cleaning frequency. However, the CMS 106 can implement any variation or combination of increasing/decreasing cleaning time and increasing/decreasing cleaning frequency when the threshold value is met, as desired. Furthermore, in some embodiments block 508 can be omitted, and the CMS 106 can determine the cleaning time/cleaning frequency based at least on the current temporal data and the temporal data associated with the previous product requests.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for automatically causing a cooking device to prepare a product, the method comprising:
under control of one or more computing devices configured with specific computer-executable instructions,
obtaining first time of day data;
identifying in real time, using the one or more computing devices, a user associated with at least one product purchase of a plurality of product purchases based at least in part on the first time of day data and second time of day data associated with the plurality of product purchases; and
causing, by the one or more computing devices, a cooking device to automatically prepare a product for the user based at least in part on said identifying.

2. The computer-implemented method of claim 1, wherein the first time of day data corresponds to a first time period and the second time of day data corresponds to a second time period that precedes and does not overlap with the first time period.

3. The computer-implemented method of claim 1, wherein the first time of day data corresponds to a first time period and the second time of day data corresponds to a second time period that precedes and does not overlap with the first time period, and wherein the product is the same as a product purchased by the user during the second time period.

4. The computer-implemented method of claim 1, wherein causing the cooking device to automatically prepare the product comprises identifying user data associated with the user and preparing the product based at least in part on the user data.

5. The computer-implemented method of claim 1, wherein causing the cooking device to automatically prepare the product comprises identifying user data associated with the user and preparing the product based at least in part on the user data, wherein the user data identifies the product for preparation from a plurality of products.

6. The computer-implemented method of claim 1, wherein causing the cooking device to automatically prepare the product comprises identifying user data associated with the user and preparing the product based at least in part on the user data, wherein the user data identifies the product for preparation from a plurality of products purchased by the user.

7. The computer-implemented method of claim 1, wherein the second time of day data includes a plurality of time entries, wherein each time entry of the plurality of time entries is associated with one of the plurality of product purchases, and wherein identifying the user comprises comparing the first time of day data with the time entries of the second time of day data.

8. The computer-implemented method of claim 1, wherein identifying the user comprises:
identifying a predetermined range of time based at least in part on the first time of day data,
identifying product purchase data that satisfies the predetermined range of time based at least in part on a comparison of the second time of day data with the predetermined range of time, wherein the second time of day data is associated with the product purchase data, and
identifying the user from the product purchase data.

9. The computer-implemented method of claim 8, wherein the predetermined range of time corresponds to a time range within a day.

10. The computer-implemented method of claim 8, wherein the predetermined range of time is based at least in part on at least one of time of day of the first time of day data, day of week of the first time of day data, and season of the first time of day data.

11. The computer-implemented method of claim 8, wherein the predetermined range of time is a different day than the first time of day data.

12. The computer-implemented method of claim 1, wherein identifying the user comprises:
identifying a predetermined range of time based at least in part on the first time of day data,
identifying a set of product purchase data that satisfy the predetermined range of time based at least in part on a comparison of the second time of day data with the predetermined range of time, wherein the second time of day data is associated with the set of product purchase data,
identifying product purchase data from the set of product purchase data, and
identifying the user from the product purchase data.

13. The computer-implemented method of claim 1, wherein the second time of day data includes a plurality of time entries, wherein each time entry of the plurality of time entries is associated with one of the plurality of product purchases.

14. The computer-implemented method of claim 1, wherein the second time of day data associated with the product purchase comprises data corresponding to a time at which the product purchase occurred.

15. The computer-implemented method of claim 1, wherein the cooking device comprises a coffee machine and the product comprises a coffee beverage.

16. A system, comprising:
a computing device in communication with one or more non-transitory computer-readable media storing product purchase data regarding a plurality of product purchases, and first time of day data associated with the plurality of product purchases, wherein the computing device is configured to:
obtain second time of day data;
identify in real time a user associated with at least one product purchase of the plurality of product purchases based at least in part on the first time of day data and the second time of day data; and
request a cooking device to automatically prepare a product for the user based at least in part on identification of the user; and
a cooking device communicatively coupled with the computing device and configured to receive the request and automatically prepare the product for the user based at least in part on the request.

17. The system of claim 16, wherein to identify the user, the computing device is configured to:
identify a predetermined range of time based at least in part on the second time of day data,
identify product purchase data that satisfies the predetermined range of time based at least in part on a comparison of the first time of day data with the predetermined range of time, wherein the first time of day data is associated with the product purchase data, and
identify the user from the product purchase data.

18. The system of claim 16, wherein causing the cooking device to automatically prepare the product comprises identifying user data associated with the user and preparing the product based at least in part on the user data, wherein the user data identifies the product for preparation from a plurality of products purchased by the user.

19. Computer-readable, non-transitory storage media having computer-executable instructions for automatically causing a cooking device to prepare a product, that, when executed by one or more computing devices, causes the one or more computing devices to:
- obtain first time of day data;
- identify in real time, using the one or more computing devices, a user associated with at least one product purchase of a plurality of product purchases based at least in part on the first time of day data and second time of day data associated with the plurality of product purchases; and
- cause, by the one or more computing devices, a cooking device to automatically prepare a product for the user based at least in part on identification of the user.

20. The computer-readable, non-transitory storage media of claim 19, to identify the user, the computer-executable instructions cause the one or more computing devices to:
- identify a predetermined range of time based at least in part on the first time of day data,
- identify a set of product purchase data that satisfy the predetermined range of time based at least in part on a comparison of the second time of day data with the predetermined range of time, wherein the second time of day data is associated with the set of product purchase data,
- identify product purchase data from the set of product purchase data, and
- identify the user from the product purchase data.

* * * * *